United States Patent [19]

Wasel-Nielen et al.

[11] 4,303,541

[45] Dec. 1, 1981

[54] PROCESS FOR CHARGING A LATENT HEAT STORAGE DEVICE WITH A SALT HYDRATE COMPOSITION

[75] Inventors: Joachim Wasel-Nielen, Hirschberg; Karl Merkenich, Rimbach, both of Fed. Rep. of Germany; Oskar Gehrig, deceased, late of Dannstadt, Fed. Rep. of Germany, by Ralf Buettner, heir; Klaus Sommer, Heidelberg, Fed. Rep. of Germany

[73] Assignee: Benckiser-Knapsack GmbH Ladenburg, Ladenburg, Fed. Rep. of Germany

[21] Appl. No.: 188,352

[22] Filed: Sep. 18, 1980

[30] Foreign Application Priority Data

Sep. 20, 1979 [DE] Fed. Rep. of Germany ....... 2937959

[51] Int. Cl.$^3$ .......................... C09K 5/06; F24H 7/00; F24J 3/02
[52] U.S. Cl. .................................. 252/70; 23/302 R; 23/302 T; 126/400; 165/104.12
[58] Field of Search ......................... 252/70; 126/400; 165/104 S; 23/302 R, 302 T

[56] References Cited

U.S. PATENT DOCUMENTS 2,677,367  5/1954  Telkes .
4,187,189  2/1980  Telkes ................................ 252/70

FOREIGN PATENT DOCUMENTS 31795    7/1969  Australia .
2207338  8/1973  Fed. Rep. of Germany .
2639173  3/1978  Fed. Rep. of Germany .
2753598  6/1979  Fed. Rep. of Germany ........ 252/70

*Primary Examiner*—Dennis L. Albrecht
*Attorney, Agent, or Firm*—Schwartz, Jeffery, Schwaab, Mack, Blumenthal & Koch

[57] ABSTRACT

Disclosed is a process for preparing a salt hydrate composition having a phase transition heat greater than the heat capacity of water at a corresponding temperature, for charging a latent heat storage device. The process comprises the steps of providing an acid component of the salt hydrate; providing a base component of the salt hydrate, wherein at least one of the acid or base components comprises a liquid; and mixing the acid component and the base component together to cause a neutralization reaction. The acid and base components are mixed in a ratio and in respective concentrations to produce a salt hydrate solution saturated at the desired phase transition point.

13 Claims, No Drawings

PROCESS FOR CHARGING A LATENT HEAT STORAGE DEVICE WITH A SALT HYDRATE COMPOSITION

BACKGROUND OF THE INVENTION

The present invention relates to a process for charging latent heat storage devices, and more especially to a process for charging latent heat storage devices with salt hydrates.

In the utilization of thermal energy, storage thereof (i.e., the station between the supply or production of energy and the demand or consumption of it) is of great importance. This is true to an even higher degree in the utilization of low temperature heat, such as may be obtained, for example, from solar energy or from the heat of the environment. It is obvious that particularly in these cases there is a disparity between the supply and the demand of the energy.

The advantages resulting from the utilization of latent heat, for example, the heat of melting, in contrast to storage in conventional water or packed reservoirs, have been discussed in recent years on a relatively broad basis, in particular for applications in low temperature thermal systems, and have lead to the concept of latent heat storage devices. Principally, salt hydrates with suitable melting points have been proposed and investigated; see for example VDI-Berichte, 288, 79 (1977).

Various systems are conceivable as storage devices and are mentioned as such in the literature. On the one hand, they may consist of containers bounded by heat exchangers and designed as flat as possible in order to prevent interference with the transport of heat. To eliminate stratification effects which could lead to the precipitation of lower hydrates, the lamellar subdivision of the container or packaging into flat bags (as disclosed in DE-OS No. 22 23 882) has been proposed. Jacketing with synthetic plastic materials according to DE-OS No. 27 41 829 is also known. Furthermore, packing of the storage medium into synthetic plastic spheres or similar containers, such as those used for the cooling of beverages, is conceivable. In such cases, it is possible lto design volume into the storage tank in the third dimension also, as here the transport of heat is effected by other liquids (e.g., oil, water). Furthermore, constant intermixing of the storage medium in the liquid state, by means of a heat carrier liquid which bubbles through the melt but is immiscible with it, has been described in "Tagung der Deutschen Gesellschaft fuer Sonnenenergie", Proceedings volume III, 1977, page 80.

In DE-OS No. 26 58 120 and No. 27 20 188, containers with flexible walls or with expanding heat transport liquids are proposed to equalize the volume changes occurring during phase changes.

Heretofore, molten salt hydrates were used for charging of the storage devices. This process is less than favorable for a number of reasons:

During the melting of crystalline solids in the powder form, very high resistance to the transport of heat, among others by the entrapped air, must be overcome. These conditions are aggravated by sintering or partial melting processes associated with volume changes.

Heat transfer is extremely slow also during the melting of more compact salt hydrate in large containers.

Strongly hydrate-containing salts, for examples, Glauber salt or disodium-phosphate-dodecahydrate, have a very strong tendency to decompose under certain conditions in storage. This leads, on the one hand, to losses of water which are difficult to determine and therefore equally difficult to compensate for, and on the other hand, frequently to such a stubborn sintering of the salt that mechanical comminution of the material prior to the filling of the storage device or the melting vessel becomes unavoidable.

Salts containing water of hydration, for example, disodiumphosphate-dodecahydrate, are frequently more difficult to prepare, because of unfavorable thermodynamical data and relatively low melting points, than lower hydrates, such as, for example, disodiumphosphate-dihydrate. Naturally, this is reflected by the cost of production.

The highly different volumes of commercially available salts and their resulting melts render multiple refilling of the melting or storage vessels or a very large scale design of the melting vessel necessary.

In the course of the melting process, relatively large temperature differences are developed between the nonhomogeneous areas, which readily lead to stratification effects and consequently to the precipitation of lower hydrates. This makes it necessary to homogenize the melt by means of intensive agitation after melting. The end of the melting process can, however, be detected only very difficultly.

It is not economical to melt a salt hydrate with a high input of energy. The dissolution of lower hydrates or of anhydrous salts (U.S. Pat. No. 2,677,367) in water also requires the introduction of heat in order to reach the phase transformation temperature.

SUMMARY OF THE INVENTION

It is therefore an object of the present invention to provide an improved method for preparing a salt hydrate composition for charging a latent heat storage device.

Another object of the invention resides in providing an improved method of charging a latent heat storage device with a salt hydrate composition.

It is a particular object of the invention to provide a method for preparing a salt hydrate composition for a latent heat storage device which avoids the preparation and charging of a molten salt hydrate and the other disadvantages of the techniques employed according to the prior art discussed hereinabove.

In accomplishing the foregoing objects, there has been provided in accordance with the present invention a process for preparing a salt hydrate composition having a phase transition heat greater than the heat capacity of water at a corresponding temperature, for charging a latent heat storage device. The process comprises the steps of providing an acid component of the salt hydrate providing a base component of the salt hydrate, wherein at least one of the acid or base components comprises a liquid; and mixing the acid component and the base component together to cause a neutralization reaction. The acid and base components are mixed in a ratio and in respective concentrations to produce a salt hydrate solution saturated at the desired phase transition point.

In accordance with another aspect of the invention, the process further comprises the step of charging the resulting salt hydrate composition into a latent heat storage device.

Further objects, features and advantages of the present invention will become apparent from the detailed description of preferred embodiments which follows.

DETAILED DESCRIPTION OF PREFERRED EMBODIMENTS

It has now been discovered that the above-described disadvantages may be avoided and latent heat storage devices prepared in a much more advantageous manner by charging saturated solutions into the vessels at the phase transformation point desired, where the solutions have been obtained by means of neutralization reactions and the addition of any necessary amounts of water and wherein at least one component is liquid.

I. The Neutralization of Acids and Bases:

One possible way to prepare such a saturated solution to be used as a latent heat storage device comprises the neutralization of, for example, phosphoric acid or sulfuric acid, and sodium hydroxide. The concentration of the acid and the base must be chosen so that sufficient water is present to obtain the degree of hydration desired. This may be effected by using concentrated acids and bases and adding the necessary amount of water. But it is also possible to begin with suitably diluted acids and bases. In a purely schematic manner, the process may be illustrated by the following reaction equations:

(a) $H_3PO_4 + 2NaOH + 10H_2O \rightarrow Na_2HPO_4 \cdot 12H_2O$ (b) $H_2SO_4 + 2NaOH + 8H_2O \rightarrow Na_2SO_4 \cdot 10H_2O$ In these cases, when concentrated and in particular strong bases and acids are used, both heats of dilution and the substantial heats of neutralization are released.

The amount of heat released in the process may be higher than the temperature necessary to arrive at the saturated solution, so that under certain conditions, cooling may be required in order to assure a rapid reaction. The heat removed in this manner may be utilized elsewhere, for example, for the thermal loading of discharged storage facilities or in combination with the variant to be described hereinbelow.

II. The Neutralization of Basic or Acid Salts

The following reactions may be employed initially to prepare saturated solutions of disodiumphosphatedodecahydrate:

(a) $2Na_3PO_4 + H_3PO_4 + 36H_2O \rightarrow 3Na_2HPO_4 \cdot 12H_2O$ (b) $NaH_2PO_4 \cdot 30 NaOH + 11H_2O \rightarrow Na_2HPO_4 \cdot 12H_2O$ By using suitably diluted bases and acids and by the appropriate utilization of the heats of dilution and neutralization, it is possible to prepare the saturated solution of the salt hydrate desired without additional heating or cooling. Relatively accurate metering devices and an agitator assembly are the only special equipment required. This is also true for the following examples:

(c) $KH_2PO_4 + 2KOH + 5H_2O \rightarrow K_3PO_4 \cdot 7H_2O$ (d) $NaHSO_4 + NaOH + 9H_2O \rightarrow Na_2SO_4 \cdot 10H_2O$ The multiple possibilities also depend on the type of salt hydrate desired and on the corresponding acid.

Thus, in the case of tripotassiumphosphateheptahydrate, only neutralization with bases is possible, wherein the starting materials may consist of monopotassiumdihydrogenphosphate and dipotassiumhydrogenphosphate or the corresponding hydrates.

In the preparation of the salts of divalent acids, for example, of sulfuric acid, the choice of possibilities is restricted. Only one neutralization reaction with either a base or an acid is possible.

In the preparation of saturated solutions of hydrates having monovalent acids, such as potassiumfluoride-tetrahydrate, the more or less neutralized salts of the same acid cannot be used as the starting material. Oxides or carbonates may be employed here as the starting products:

(e) $K_2CO_3 + 2HF + 7H_2O \rightarrow 2KF \cdot 4H_2O + CO_2$ (f) $CaO + 2HCl + 5H_2O \rightarrow CaCl_2 \cdot 6H_2O$ It is obvious that saturated solutions of salts of multivalent acids may also be obtained in this manner.

Only saturated solutions of salts which have phase transition points higher than the heat capacity of water at the corresponding temperature and which contain at least 3 more water molecules of crystallization than the next lower hydrate or anhydrous salt may be used for the purpose of the invention.

by the preparation of such saturated solutions, which are suitable as latent heat storage devices and which may be obtained by initially charging a liquid phase (water, acid, base or solution) and utilizing the heat of dilution and/or neutralization, not only the above-mentioned disadvantages associated with the melting of commercial solid salt hydrates may be eliminated, but also the following advantages may be obtained:

Preparation is much more rapid and less energy is required, since for example, interferences with the transport of heat are avoided.

Accurately defined charges and products may be prepared conveniently.

The use is eliminated of salt hydrates which are difficult to produce industrially in the crystalline form and which therefore are relatively expensive.

Automatic control of the processes is readily feasible.

Homogeneity is assured at any moment by means of agitation. The time-consuming secondary homogenization by the dissolution of lower hydrates is no longer necessary.

Additives, such as accelerators of crystallization, corrosion inhibitors, excess water to compensate for losses of water, etc., may be introduced conveniently.

The use of readily available starting materials, such as acids and bases or carbonates, opens up entirely new economic aspects in comparison with the employment heretofore of salt hydrates.

the choice of the most favorable mode of charging latent heat storage devices from among those mentioned hereinabove, depends on the saturated solution selected and the conditions prevailing in the plant manufacturing the storage devices. Variant II requires no high capacity cooling or heating installations. It is necessary to use only either an acid or a base. In Variant I, the economically most favorable starting materials are employed. Furthermore, the process may be carried out with a net production of excess of energy. Of course, the use of a somewhat more costly, more automatically controlled reactor and operators qualified therefor, may be more advisable in certain instances.

The preparation of the saturated solutions is not necessarily restricted to the location of the storage device. It will be advantageous in numerous cases to prepare the solution in existing installations of enterprises familiar with such problems and to transport the finished solution in suitable vessels or tank cars to the charging location. Thus, for examle, the preparation of a saturated disodiumphosphate solution is readily effected in the crystallization facilities of phosphate manufacturers. There are no difficulties in the transportation of solutions at 60°–70° C.

The essence of the present invention thus consists of the use of solutions saturated at the desired transition point for charging of latent heat storage devices, while providing the above-mentioned advantages in comparison with the known processes of melting or dissolution of commercial salts.

It is also readily possible to apply the saturated solutions to a porous or microporous support material that may be used to form a matrix, a granular bed, etc., in order to localize the heat storage medium or to improve the transfer of heat between the storage and the transport medium. It is also possible to use the saturated solutions in heat batteries or heat buffers on the basis of the same principle.

EXAMPLE 1

Comparative Example

Charge: 5 kg of a commercial disodiumphosphatedodecahydrate ($P_2O_5$ content: approximately 20%), 25 g water.

The phosphate was melted in a closed polyethylene flask in a drying cabinet, following the addition of a 0.5% water to compensate for the water of decomposition. The melting process at 60° C. required more than 48 hours. The original bulk volume in the vessel used was reduced by more than one-half (melt volume).

Above the melting temperature, a clear solution was obtained over approximately 10% precipitated disodiumphosphate-heptahydrate and dihydrate. Only intensive and prolonged agitation led to the solution of the precipitates and the homogenization of the melt.

EXAMPLE 2

(Variant I,a)

| Charge: | 2230 g 50% sodium hydroxide |
| | 1650 g 83% phosphoric acid |
| | 1120 g water |
| | corresponding to 5 kg disodium-phosphate-dodecahydrate |

In a closed 5 liter polyethlene vessel, equipped with a dripping funnel, an agitator and a thermometer, the water was introduced and the phosphoric acid added. The temperature rose to approximately 45° C. The rate of addition of the 50% sodium hydroxide was controlled by means of the dripping funnel so that the temperature of 85° C. was not exceeded. With simultaneous intensive external water cooling, a preparation period of about one-half hour was required.

A completely homogeneous, clear disodiumphosphate solution was obtained. It was conveniently transferred to an experimental storage device after cooling to approximately 50° C.

EXAMPLE 3

(Variant II, a, e)

Charge: 1605 g commercially available trisodiumphosphate-semihydrate ($P_2O_5$ content approximately 40%, containing for manufacturing reasons 3% $Na_2CO_3$),
585 g 83% phosphoric acid
2830 g water
corresponding to 5 kg disodiumphosphate-dodecahydrate.

In a 5 liter glass beaker equipped with a magnetic agitator, the water was introduced and the phosphoric acid added. The heat of dilution led to a rise in temperature of approximately 2° C. The rather rapid addition of the trisodiumphosphate increased the temperature of the reaction solution to approximately 60° C. This temperature was not exceeded or reduced significantly during the preparation in the reaction vessel employed, which was neither heated nor cooled. The $CO_2$ development did not interfere and provided an additional mixing effect. The entire reaction was complete in about one-quarter of an hour. A clear, homogeneous disodiumphosphate solution was obtained; it was filled without difficulty into an experimental storage device.

EXAMPLE 4

(Variant II, b)

Charge: 1675 g commercially available monosodiumdihydrogenphosphate, anhydrous
1120 g 50% sodium hydroxide
2205 g water
corresponding to 5 kg disodiumphosphate-dodecahydrate The water was introduced into a 5 liter glass beaker equipped with a magnetic agitator and the 50% sodium hydroxide added. The temperature of the soludtion rose from 25° C. to approximately 50° C. The monosodiumphosphate powder was introduced at a relatively rapid rate, while not permitting the temperature to exceed 70° C. A completely clear solution was obtained after about one-half hour.

The solutions obtained in accordance with Examples 2 to 4 solidified under 35° C. with the release of their latent heat. Melting led to liquids without residues.

What is claimed is:

1. A process for preparing a salt hydrate composition having a phase transition heat greater than the heat capacity of water at a corresponding temperature, for charging a latent heat storage device, said process comprising the steps of:
    providing an acid component of the salt hydrate;
    providing a base component of the salt hydrate, wherein at least one of said acid or base components comprises a liquid; and
    mixing said acid component and said base component together to cause a neutralization reaction, said acid and base components being mixed in a ratio and in respective concentrations to produce a salt hydrate solution saturated at the desired phase transition point.

2. A process according to claim 1, further comprising the step of charging the resulting salt hydrate composition into a latent heat storage device.

3. A process according to claim 1 or 2, wherein said acid component is selected from an acid of the salt hydrate or an acid salt of the salt hydrate.

4. A process according to claim 1 or 2, wherein said base component is selected from a base of the salt hydrate or a basic salt of the salt hydrate.

5. A process according to claim 4, wherein said base component comprises a carbonate, an oxide or a hydroxide.

6. A process according to claim 1, further comprising the step of adding during or after said mixing step at least one additional component selected from a crystallization accelerator, a corrosion inhibitor or a stratification inhibiting agent.

7. A process according to claim 1, further comprising the step of adding during or after said mixing step a slight excess of water.

8. A process according to claim 1, wherein said acid component comprises phosphoric acid and said base component comprises trisodium phosphate $Na_3PO_4$, whereby said salt hydrate comprises disodium phosphate-dodecahydrate $Na_2HPO_4.12H_2O$.

9. A process according to claim 1, wherein said acid component comprises monosodium dihydrogenphosphate $NaH_2PO_4$ and said basic component comprises sodium hydroxide, whereby said salt hydrate comprises disodium phosphate-dodecahydrate $Na_2HPO_4.12H_2O$.

10. A process according to claim 1, wherein said acid component comprises mono-potassium dihydrogen phosphate $KH_2PO_4$ and said base component comprises potassium hydroxide KOH, whereby said salt hydrate comprises tripotassium phosphate heptahydrate $K_3PO_4.7H_2O$.

11. A process according to claim 1, wherein said acid component comprises mono-sodium hydrogen sulfate $NaHSO_4$ and said base component comprises sodium hydroxide NaOH, whereby said salt hydrate comprises sodium sulfate decahydrate $Na_2SO_4.10H_2O$.

12. A process according to claim 1, wherein said acid component comprises hydrofluoric acid HF and said base component comprises potassium carbonate $K_2CO_3$, whereby said salt hydrate comprises potassium fluoride quadrohydrate $KF.4H_2O$.

13. A process according to claim 1, wherein said acid component comprises hydrochloric acid HCl and said base component comprises calcium oxide CaO, whereby said salt hydrate comprises calcium chloride hexadhydrate $CaCl_2.6H_2O$.

* * * * *

UNITED STATES PATENT OFFICE
CERTIFICATE OF CORRECTION

Patent No. 4,303,541      Dated December 1, 1981

Inventor(s) Joachim WASEL-NIELEN et al

It is certified that error appears in the above-identified patent and that said Letters Patent are hereby corrected as shown below:

Column 1, line 51, please delete "volume" and insert therefor -- Volume --;

Column 2, line 56, please insert a comma -- , -- after "hydrate";

Column 3, line 54, please delete "30" and insert therefor -- + -- after $NaH_2PO_4$;

Column 4, line 31, please delete "by" and insert therefor -- By --;

Column 4, line 59, please delete "the" and insert therefor -- The --;

Column 5, line 10, please delete "examle" and insert therefor -- example --;

UNITED STATES PATENT OFFICE
CERTIFICATE OF CORRECTION

Patent No. 4,303,541          Dated December 1, 1981

Inventor(s) Joachim WASEL-NIELEN et al

It is certified that error appears in the above-identified patent and that said Letters Patent are hereby corrected as shown below:

Column 5, line 34, please delete "phatedodecahydrate" and insert therefor -- phate-dodecahydrate --;

Column 6, line 43, please delete "soludtion" and insert therefor -- solution --.

Signed and Sealed this

Eighteenth Day of May 1982

[SEAL]

Attest:

Attesting Officer

GERALD J. MOSSINGHOFF
Commissioner of Patents and Trademarks